(12) United States Patent
Berkowitz et al.

(10) Patent No.: US 9,952,860 B2
(45) Date of Patent: Apr. 24, 2018

(54) DYNAMIC MEMORY MANAGEMENT FOR A VIRTUAL SUPERCOMPUTER

(71) Applicant: Veriscape, Inc., Los Alamos, NM (US)

(72) Inventors: Gary C. Berkowitz, Centennial, CO (US); Charles Wurtz, Los Alamos, NM (US)

(73) Assignee: Veriscape, Inc., Los Alamos, NM (US)

( * ) Notice: Subject to any disclaimer, the term of this patent is extended or adjusted under 35 U.S.C. 154(b) by 1010 days.

(21) Appl. No.: 14/206,035

(22) Filed: Mar. 12, 2014

(65) Prior Publication Data

US 2014/0278340 A1 Sep. 18, 2014

Related U.S. Application Data

(60) Provisional application No. 61/778,983, filed on Mar. 13, 2013.

(51) Int. Cl.
*G06F 9/455* (2006.01)
*G06F 9/30* (2018.01)

(52) U.S. Cl.
CPC ........ *G06F 9/3004* (2013.01); *G06F 9/45541* (2013.01); *G06F 2009/45583* (2013.01)

(58) Field of Classification Search
None
See application file for complete search history.

(56) References Cited

U.S. PATENT DOCUMENTS 4,462,075 A 7/1984 Mori et al.
4,468,728 A 8/1984 Wang
(Continued)

FOREIGN PATENT DOCUMENTS

WO 93/04432 A2 3/1993

OTHER PUBLICATIONS

Various 2000 press releases for Veriscape, obtained via 'waybackmachine' 2006; pp. 1-9.
(Continued)

*Primary Examiner* — Cedric D Johnson
(74) *Attorney, Agent, or Firm* — Edell, Shapiro & Finnan, LLC

(57) ABSTRACT

Present invention embodiments enable the handling of various index-memory architectures for a virtual supercomputer that would allow for a heterogeneous storage of variable length index words with non-sequential addressing, and also dynamic changes to the index-memory architecture. A computer-implemented system, method, and apparatus allow for different types of node index memory (NIM) architectures for the virtual supercomputer. The first type allows for homogenous NIM segments, and implementing sequential node-number addressing. A second type of architecture allows for heterogeneous IW configurations (variable length and field structure), but sill uses sequential node-number addressing. A third type allows for non-sequential node-number addressing, but still uses homogeneous IW configurations. To implement this, a new virtual hardware element is required, an Index-Word Address Table. The fourth type of architecture is a fully variable random-access architecture, whereby index-words are not sequential, nor are they identically configured. This also requires the Index-Word Address Table.

14 Claims, 6 Drawing Sheets

VIRTUAL SUPERCOMPUTER - EXPANDED VIEW OF THE NODE INDEX MEMORY UNIT

(56) References Cited

U.S. PATENT DOCUMENTS

| | | | |
|---|---|---|---|
| 5,072,371 | A | 12/1991 | Benner et al. |
| 5,088,031 | A | 2/1992 | Takasaki et al. |
| 5,101,346 | A | 3/1992 | Ohtsuki |
| 5,193,184 | A * | 3/1993 | Belsan ............... G06F 3/0601 707/999.2 |
| 5,404,512 | A | 4/1995 | Powers et al. |
| 5,404,513 | A | 4/1995 | Powers et al. |
| 5,442,784 | A | 8/1995 | Powers et al. |
| 5,515,488 | A | 5/1996 | Hoppe et al. |
| 5,553,291 | A | 9/1996 | Tanaka et al. |
| 5,577,241 | A | 11/1996 | Spencer |
| 5,692,193 | A | 11/1997 | Jagannathan et al. |
| 5,802,290 | A | 9/1998 | Casselman |
| 5,911,138 | A | 6/1999 | Li et al. |
| 5,925,102 | A | 7/1999 | Eilert et al. |
| 5,935,216 | A | 8/1999 | Benner et al. |
| 5,944,779 | A | 8/1999 | Blum |
| 5,944,783 | A | 8/1999 | Nieten |
| 5,983,268 | A | 11/1999 | Frievald et al. |
| 5,987,497 | A | 11/1999 | Allgeier |
| 6,003,065 | A | 12/1999 | Yan et al. |
| 6,003,137 | A | 12/1999 | Kawasaki |
| 6,012,055 | A | 1/2000 | Campbell et al. |
| 6,047,283 | A | 4/2000 | Braun |
| 6,119,101 | A | 9/2000 | Peckover |
| 6,269,391 | B1 | 7/2001 | Gillespie |
| 6,327,593 | B1 | 12/2001 | Goiffon |
| 6,397,212 | B1 | 5/2002 | Biffar |
| 6,411,950 | B1 | 6/2002 | Moricz et al. |
| 6,421,675 | B1 | 7/2002 | Ryan et al. |
| 6,453,312 | B1 | 9/2002 | Goiffon et al. |
| 6,484,162 | B1 | 11/2002 | Edlund et al. |
| 6,484,190 | B1 | 11/2002 | Cordes et al. |
| 6,563,514 | B1 | 5/2003 | Samar |
| 6,615,207 | B1 | 9/2003 | Lawrence |
| 6,732,088 | B1 | 5/2004 | Glance |
| 6,769,033 | B1 | 7/2004 | Bass et al. |
| 6,839,714 | B2 | 1/2005 | Wheeler et al. |
| 6,859,455 | B1 | 2/2005 | Yazdani et al. |
| 7,299,255 | B2 | 11/2007 | Tenorio |
| 7,668,811 | B2 | 2/2010 | Janssens et al. |
| 7,756,750 | B2 | 7/2010 | Venkiteswaran |
| 7,774,191 | B2 | 8/2010 | Berkowitz et al. |
| 8,249,885 | B2 | 8/2012 | Berkowitz et al. |
| 8,271,259 | B2 | 9/2012 | Berkowitz et al. |
| 2001/0051893 | A1 | 12/2001 | Hanai et al. |
| 2002/0016794 | A1 | 2/2002 | Keith, Jr. |
| 2002/0156695 | A1 | 10/2002 | Edwards |
| 2003/0005068 | A1 | 1/2003 | Nickel et al. |
| 2003/0061122 | A1 | 3/2003 | Berkowitz et al. |
| 2003/0167409 | A1 | 9/2003 | Sussman |
| 2004/0030694 | A1 | 2/2004 | Tokumo et al. |
| 2004/0128155 | A1 | 7/2004 | Vaidyanathan et al. |
| 2004/0205751 | A1 * | 10/2004 | Berkowitz ............ G06F 9/3004 718/1 |
| 2004/0254870 | A1 | 12/2004 | Chitaley et al. |
| 2005/0049938 | A1 | 3/2005 | Venkiteswaran |
| 2005/0193029 | A1 | 9/2005 | Rom et al. |
| 2005/0222987 | A1 | 10/2005 | Vadon |
| 2005/0273706 | A1 | 12/2005 | Manber et al. |
| 2005/0289168 | A1 | 12/2005 | Green et al. |
| 2006/0150098 | A1 | 7/2006 | Ma |
| 2008/0027830 | A1 | 1/2008 | Johnson et al. |
| 2008/0040220 | A1 | 2/2008 | Levy et al. |
| 2008/0059297 | A1 | 3/2008 | Vallier et al. |
| 2008/0221915 | A1 | 9/2008 | Berkowitz et al. |
| 2009/0094227 | A1 | 4/2009 | Berkowitz et al. |
| 2010/0191616 | A1 | 7/2010 | Berkowitz et al. |
| 2011/0004534 | A1 | 1/2011 | Venkiteswaran |
| 2011/0004566 | A1 * | 1/2011 | Berkowitz ............ G06F 9/3004 705/36 R |
| 2013/0080482 | A1 | 3/2013 | Berkowitz et al. |

OTHER PUBLICATIONS

Massaro; 'Veriscape to deliver Rapid Derivatives Valuations'; p. 1, Wall Street & Technology, Feb. 2000.

Spaeth; Los Alamos County to fund startups; New Mexico Business Weekly; pp. 1-3, Feb. 2002.

Webb; Former NY e-business firm to open HQ in Los Alamos; New Mexico Business Weekly; pp. 1-2; Sep. 2002.

Aho, V.A., et al., "The Design and Analysis of Computer Algorithms," 1974, Reading, MA: Addison-Wesley, pp. 1-7.

Hillis, W.D. "The Connection Machine," 1985, Cambridge: MIT Press, pp. 1-6.

Hull, J.C. "Options, Futures, and Other Derivative Securities (2nd Ed).," 1993, Englewood Cliffs: Prentice-Hall, pp. 1-9.

Jorion, P. "Value at Risk," 1997, New York: McGraw-Hill, pp. 1-4.

Knuth, D.E. "The Art of Computer Programming.," 1968, Reading, MA: Addison-Wesley, pp. 1-8.

Lawrence, D. "Measuring and Managing Derivative Market Risk," 1996, London: ITP, pp. 1-6.

Yves Rasolofo, "Term Proximity Scoring for Keyword-based Retrieval Systems", ECIR 2003, Springer-Verlag Berlin, pp. 207-218.

Anom; "Distributed Search Engines" describing Veriscape product; O'Reilly P2P; May 31, 2001; 2 pages.

Business/Technology Editors: Engelhard Chooses Breakthrough Veriscape Technology to Fill B2B Gap of Electronic Catalog Management; New York—(Business Wire)—Sep. 18, 2000; 2 pages.

International Search Report and Written Opinion, PCT Application No. PCT/US14/24210, dated Aug. 1, 2014, 7 pages.

European Search Report, Application No. 14779141.2, dated Jan. 30, 2017, 9 pages.

\* cited by examiner

INDEX-SEGMENT BASE-ADDRESS REGISTER (IBR)

| SegNum | SegAddr | Type | DDN-I | I/D Flag | DDN-D Flag | DDN-D |
|---|---|---|---|---|---|---|
| int ≥ 0 | int ≥ 0 | int [1, 4] | int ≥ 0 | bln | bln | int ≥ 0 |

FIG.5

DATA-DEFINITION WORD (DDW)

| DDN | FixLenFlag | lenDP | NumDefPaks (=j) | DefPak-1 | DefPak-2 | ... | DefPak-j |
|---|---|---|---|---|---|---|---|
| int | bln | int | int | mixed | mixed | | mixed |

FIG.6

DYNAMIC MEMORY MANAGEMENT FOR A VIRTUAL SUPERCOMPUTER

CROSS-REFERENCE TO RELATED APPLICATIONS

This application claims priority to U.S. Provisional Patent Application Ser. No. 61/778,983, entitled "Dynamic Memory Management for a Virtual Supercomputer" and filed Mar. 13, 2013, the disclosure of which is incorporated herein by reference in its entirety.

In addition, the subject application includes subject matter related to U.S. Pat. No. 7,774,191 (Berkowitz et al.) and U.S. Pat. No. 8,271,259 (Berkowitz et al.), and U.S. patent application Ser. No. 13/590,325 (U.S. Patent Application Publication No. 2013/0080482 (Berkowitz et al.)), entitled "Virtual Supercomputer", and filed on Aug. 21, 2012. The disclosures of the foregoing patents and patent application are incorporated herein by reference in their entireties.

BACKGROUND OF THE INVENTION

Technical Field of Endeavor

Present invention embodiments are generally directed to the field of computing and more specifically to the field of information processing, and even more specifically, to the field of high-demand, high-performance, and supercomputing.

Description of the Related Art

Attempts to create optimal solutions to solve specific and complex information processing tasks have focused on creating hardware architectures designed to exploit various features of the information to be processed so that such processing can be performed in an optimal manner. Hardware devices containing specialized vector processing units are one such example. Computing hardware containing multiple dedicated parallel processors are another example. Software written for such hardware formats the information into a form that takes advantage of the hardware's specialization, thus creating a computing environment that is tailored to the specific problem at hand. Such tailored solutions are usually implemented on high-end supercomputing hardware architectures with specialized software. Consequently, this approach is prohibitively expensive for most organizations, often costing millions of dollars. Additionally, once created, tailored solutions of this type are only suitable for a specific problem or class of problems.

The software written to solve specific high-performance computing problems is necessarily constrained by the features of the hardware upon which such software runs. When such software is in machine-readable form, it is tightly coupled to a specific architecture upon which it will run. Further, the underlying hardware machine architecture is almost always static, and only reconfigurable (and only partially so) in a few non-commercial machines not widely available. Even the so-called grid (or network or large-cluster) computing approaches, which rely on large numbers of interconnected physical or virtual machines, are still constrained by running on a few different types of conventional processors. While the topology of the network can be configurable in such approaches, the architecture of the underlying processors is static, and thus not tailored to the problem at hand.

BRIEF SUMMARY OF THE INVENTION

Present invention embodiments provide for crafting high-performance information processing solutions that are able to be tailored to specific problems or classes of problems in a way that such tailored solutions will perform on a variety of hardware architectures while retaining the benefits of a tailored solution that is designed to exploit the specific information processing features and demands of the problem at hand. A reconfigurable virtual machine environment is provided upon which a tailored solution to a specific problem (including a class of problems) is crafted. Additionally, an operating system for such a virtual machine is included. The information to be processed for a problem is encoded into a solution-space, or manifold of nodes, where a node can be any kind of data structure. This data representation is specifically constructed to closely match the architecture of the problem to be solved and the information to be processed. By exploring the data representation, the information comprising the problem is processed, and various possible solutions to the problem are generated and evaluated. The exploration of the data representation is performed in a controlled manner to locate a solution. The identified solution is not necessarily the optimal solution to the problem, but is sufficiently accurate and robust to be useful, at a much lower cost and time to develop.

Present invention embodiments provide a software environment in which tailored solutions to multiple problems and/or problem classes can be created. In one embodiment of the present invention, the virtual supercomputer operates on a single hardware processor platform, which may be of von Neumann or non-von Neumann architecture, and be a conventional or supercomputing platform. In another embodiment of the present invention, the virtual supercomputer operates on a distributed interconnected network of hardware processors, which may also be of any type architecture, and may be of different of types. In this second embodiment, the advantages of additional computing resources and concurrent processing can be exploited to find a solution in a highly efficient manner.

Present invention embodiments enable the handling of various index-memory architectures for a virtual supercomputer that would allow for a heterogeneous storage of variable length index words with non-sequential addressing, and also dynamic changes to the index-memory architecture. A computer-implemented system, method, and apparatus allow for different types of node index memory (NIM) architectures for the virtual supercomputer. The first type allows for homogenous NIM segments, that is segments comprising index words (IW) of identical length and field structure, and implementing sequential node-number addressing. A second type of architecture allows for heterogeneous IW configurations (variable length and field structure), but sill uses sequential node-number addressing. A third type allows for non-sequential node-number addressing, but still uses homogeneous IW configurations. To implement this, a new virtual hardware element is required, an Index-Word Address Table. The fourth type of architecture is a fully variable random-access architecture, whereby index-words are not sequential, nor are they identically configured. This also requires the Index-Word Address Table.

BRIEF DESCRIPTION OF THE DRAWINGS

FIG. 5 is an illustration of an Index-segment Base-address Register (IBR).

FIG. 6 is an illustration of a Data-Definition Word (DDW).

DETAILED DESCRIPTION OF EXAMPLE EMBODIMENTS

Figure 1:
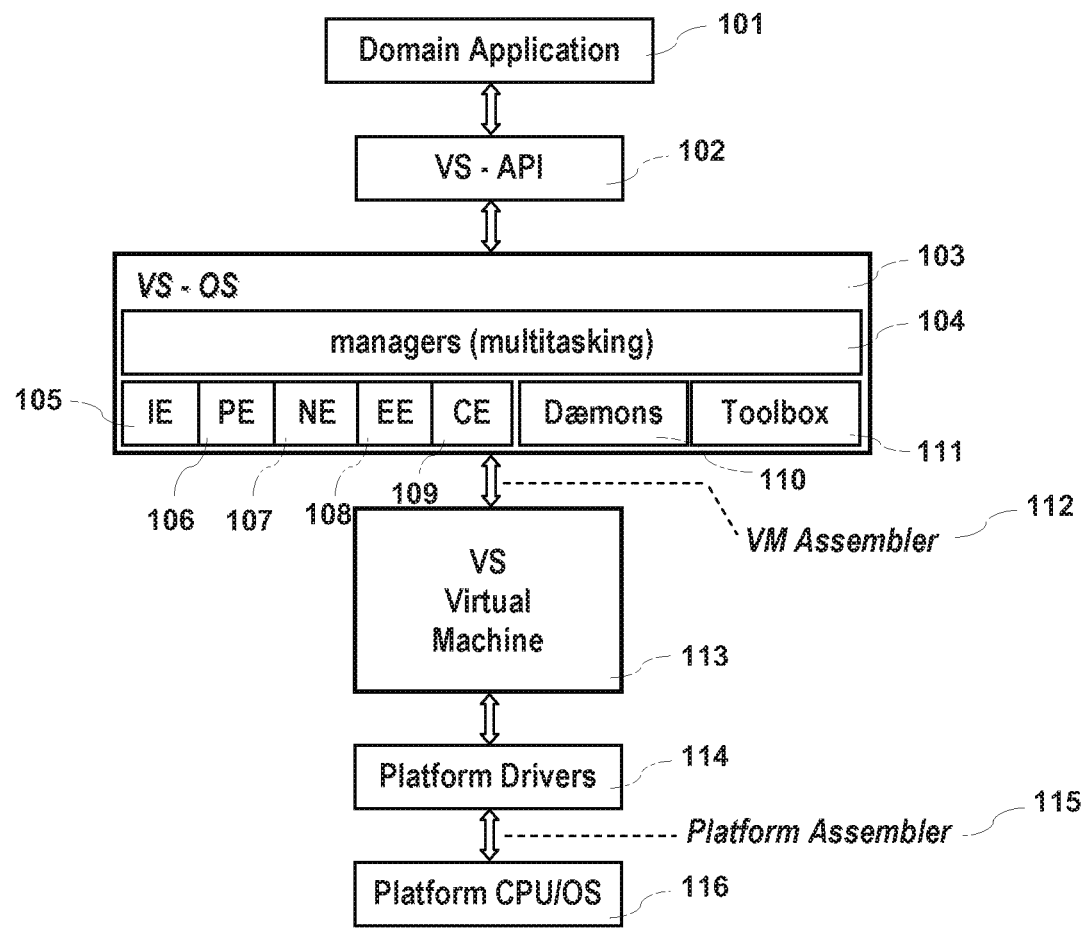
FIG. 1 is a block diagram depicting the overall configuration of an embodiment of the virtual supercomputer system according to an embodiment of the present invention.

The accompanying drawings, which are incorporated in and form part of the specification, illustrate an embodiment of the present invention and, together with the detailed description, serve to explain the principles of present invention embodiments.

Initially, a virtual supercomputer provides a conceptual, reconfigurable hardware architecture for high-performance machine-readable software. The conceptual hardware architecture masks the actual underlying hardware from the machine-readable software, and exposes to the software a virtual machine reconfigurable for the problem at hand. The virtual supercomputer thus provides to the software the operations needed for optimal processing, unconstrained by the overhead associated with those hardware operations of the underlying machine that are not relevant to the task. This not only speeds the computing required for the problem, but also importantly, it dramatically speeds the process of software application development, as the developer can write program code to a machine that directly processes operations specifically optimized for the problem to be solved.

The virtual supercomputer translates the software instructions from the format for the virtual machine into a format that a particular underlying hardware architecture (platform) can process. Each platform must have a specific virtual machine associated with it. Thus, software for the virtual supercomputer can run on a wide variety of platforms, because the virtual machine for each specific platform provides the same conceptual hardware architecture for software developers. Therefore, a large investment in a supercomputer or supercomputing cluster, with attendant maintenance and obsolescence issues, is avoided. Further, unlike a grid or conventional network computing system, which increases power in a brute-force manner by simply adding more processors, each virtual machine in a virtual supercomputer network has an internally configurable architecture, thus magnifying the power of the virtual supercomputer to provide a tailored solution.

Examples of virtual supercomputers (VS) are disclosed in U.S. Pat. Nos. 7,774,191 and 8,271,259, and U.S. patent application Ser. No. 13/590,325 (U.S. Patent Application Publication No. 2013/0080482 (Berkowitz et al.), which disclose a reconfigurable virtual hardware architecture for rapid development and execution of high-performance, tailored software solutions to computationally demanding problems. In the embodiments of these documents, the memory unit (the Node Data Memory, or NDM) that contains the data comprising various portions of the problem solution is accessed via an index memory (Node Index Memory, or NIM), which comprises a set of Index Words (TW) that each specify the address and configuration for an associated data structure (node) in the data memory. The NIM is a virtual memory space structured into segments, which in the embodiments of the above documents, each contain Index Words having identical configurations, that is, the same field structure and length, and stored sequentially. This enables maximally efficient use of the physical memory space underlying the NIM, over a range of circumstances.

However, this scheme has limitations: (1) it does not allow for direct assignment of actual node numbers by the Domain Application Program, a feature that in some circumstances may be more useful or even efficient, as it would eliminate the need for a lookup table to create internal node numbers; (2) when nodes are deleted, empty virtual memory words remain, requiring background processing (garbage collection) via tool box routines to reclaim unused space and make them available for later reassignment in a sequential order. Similarly, when new nodes are created, they must be added on to the end of the segment, which requires segment reallocation, and again, reshuffling of index words to reestablish sequential order; and (3) it does not easily accommodate changes in IW configuration during execution, as implementing such changes would require recreating NIM segments and addresses.

Present invention embodiments enable Index Word configuration and addressing to vary within a given segment. In particular, a NIM segment may contain fixed or variable length IW, and the IWs may be stored either sequentially or non-sequentially within a segment.

In a preferred embodiment of the present invention, shown in FIG. 1, a virtual supercomputer includes a Virtual Machine (VM) 113, which is the actual reconfigurable virtual hardware processor, an associated Virtual Supercomputer Operating System (VS-OS 103), a Virtual-Machine Assembler (VM Assembler 112), an Application Programming Interface (VS-API 102), Platform Drivers 114, and a Platform Assembler 115. By way of example, the virtual supercomputer may be of the type disclosed in the above-mentioned patent documents. The innovations of the VS include the merging of existing high-performance computing techniques and designs with the employment of novel approaches to computation, such as the separation of pre-computation from navigation to dramatically reduce real-time overhead, biologically-inspired "good enough" solutions, and the use of evolving data structures and adaptive computational architecture. In particular, key aspects of the VS are:

matching problem architecture—the VS is designed at every level to enable the architecture of the data space to reflect, or 'map', the architecture of the problem domain. This allows for the most efficient solution to the problem;

adaptable solution manifold—Flexible connectivity in data-structures allows for the optimal hyperspatial topology (or a mosaic of topologies)—selected from a spectrum of representations (such as point-clouds, graphs, trees, lattices, and hypercubes)—that are most relevant to a specified problem domain. Further, the manifold may adapt in a variety of ways, including value interpolation, function extrapolation, and tree elaboration;

fast application creation—The virtual machine is a unified computational substrate, including not only the virtual "hardware", but a collection of dedicated engines (configuration, instantiation, population, navigation, evolution), managers (network, thread, data-distribution, multiprocessing), and toolbox functions, which together allow for rapid development of new applications in different domains, as the structure of the problem changes, without having to build a new special-purpose architecture from scratch;

evolving structure—The approach is organic, as the VS dynamically alters its data-structures and solution-space (manifold) architecture and topology, and even reconfigures its processor design, in response to on-going changes and demands in the problem space. That is, the VS enables applications to accumulate, select or extinguish the adaptations it makes to variation in both the content and the character of the data. Thus, both the virtual machine, and the domain applications, evolve. And while a few commercial supercomputer designs employ reconfigurable computing, they are necessarily limited by realization in hardware, whereas the VS, being a virtual machine in software, provides nearly unbounded reconfigurability without the burden of acquiring an expensive and exotic mainframe;

optimized calculation—Highly-optimized function evaluation, fixed-point integer arithmetic, application-selectable precision, and various other numerical techniques provide for ultra-fast, 'accurate enough' computation;

supercomputer techniques—Software emulation of high-performance computing structures and processes (such as a small instruction set, simple and efficient data representation and handling, inherent vector representation, limited data/calculation modes, interleaved memory, table lookup, induced pointers, and distributed and parallelized computation) provide a powerful machine and cost-effective scaling and enhancement;

pre-compute and navigate—Separation of processes into pre-computation (populating the state-space) and interactive navigation (searching, modifying and selecting the resulting hyperspace of results) allows for near-real-time response, despite highly complex and computationally-intensive data manifolds;

autonomous daemons—Second-order dedicated processes operate in background, as concurrent tasks, to collect garbage, prune trees, condense redundancies, process edit-queues, interpolate with finer granularity (mesh enhancement) around selected nodes in state-space, or to extrapolate and elaborate the data structures, during both population and navigation phases;

integrated multiprocessing—In addition to its embedded netcentric design optimized for distributed processing, the virtual machine provides for inherent parallelism as multiple program threads generate multiple CPU clones, an approach not possible with a hardware machine.

A problem Domain-specific Application Program (DAP 101) requests specific processing tasks be performed for it by the VS-OS 103 running on the VM 113. These processing requests take the form of function calls that are defined by the VS-API 102. The architecture does allow for an embodiment in which direct calls to the VM 113 are made by the DAP 101.

The virtual operating system (VS-OS 103) is composed of multiple layers containing a plurality of sub-components. The uppermost layer contains the OS managers 104. The managers coordinate various aspects of the creation of the solution space and the operation of the virtual supercomputer. Managers manage various engines 105-109, and can invoke the operation of any set of engines to accomplish a task. The next layer contains Engines 105-109, Daemons 110, and a Toolbox 111. The engines 105-109 implement low-level machine instructions to send to the Virtual Machine 113 and generate code that will activate the VM 113. Daemons 110 are background processes responsible for such tasks as reconfiguring the data representation, garbage collection, and memory recapture. An example would be pruning of unused or outdated branches in a tree manifold by the navigation engine. The Toolbox 111 is a collection of routines that are frequently called by the Manager 104. To accomplish certain frequently preformed tasks, a Manager 104 has the option of issuing an instruction to an Engine (or engines) 105-109 or instead making a call to the Toolbox 111.

The solution space is the collection of nodes or other data formats that are interconnected in such a way as to construct a data representation, or manifold, with input data encoded into its topology. One possible embodiment for such a data representation is an acyclic directed graph. Other possible embodiments include, but are not limited to: independent point-clouds, ordered sets of points, cyclic graphs, balanced trees, recombining graphs, meshes, lattices and various hybrids or combinations of such representations. Each node represents one point in the data representation that is implemented using a data structure. The topology of the data representation is determined by the interconnections among the data structures. A node contains data in various forms, depending on the particular problem to be solved. Choices from among possible data representations are made based upon the attributes of the particular problem to be solved. Data contained in a node can be in the forms of numeric tags, character tags, boolean flags, numeric values, character values, objects IDs, database-record IDs, simple arrays, variable-density multidimensional arrays, symbolic functions, mathematical functions, connection pointers to other nodes, function pointers, lookup-table list pointers, linked-lists, or even pointers to other solution spaces, virtual machines, or data representations.

Figure 2:
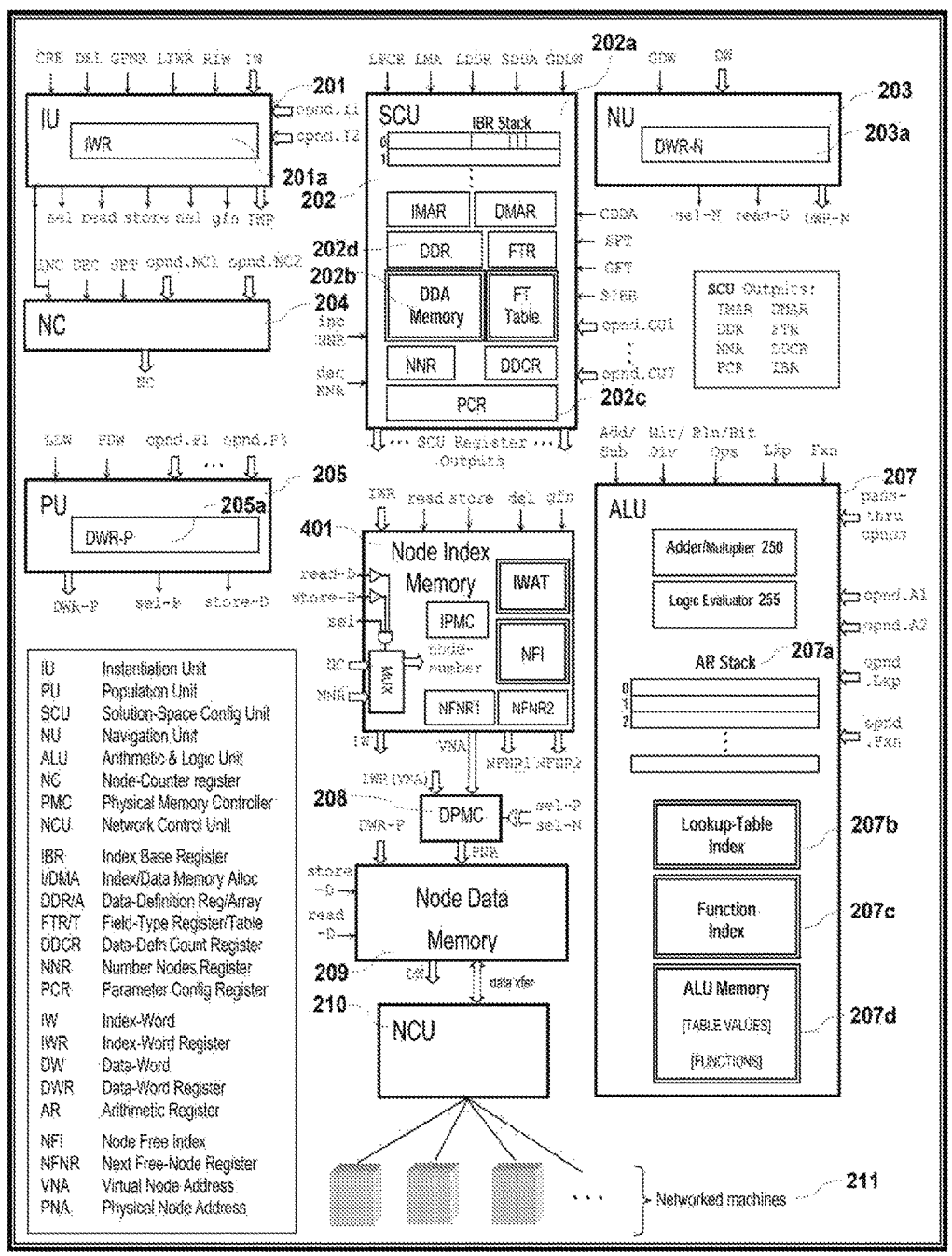
FIG. 2 is a block diagram depicting the virtual machine's major components and their interconnection.

The Instantiation Engine (IE 105) provides instructions for the Instantiation Unit (IU 201) that creates and deletes nodes (the IU 201 and other machine units are shown in FIG. 2). The population engine (PE 106) provides instructions for the population unit (PU 205) that stores data into nodes, and the arithmetic and logic unit (ALU 207) that emulates a more traditional hardware-implemented ALU. The navigation engine (NE 107) provides instructions for the navigation unit 203 that reads selected nodes. The evolution engine (EE 108) provides instructions for updating the contents of the IU 201 and the PU 205. The configuration engine (CE 109) provides instructions for the solution-space configuration unit (SCU 202), which allocates memory for the data nodes and the node index. The SCU 202 also stores configuration parameters for every aspect of the architecture.

The configuration engine (CE 109) modifies a data representation(s) to create a topology tailored to the problem at hand. When creating this topology, the CE 109 chooses from among a plurality of available topologies and modifies a chosen topology or topologies to suit the given problem. The CE 109 then stores the chosen data representation parameters, and hardware configuration parameters, into the SCU 202.

The virtual operating system 103, including its component parts, interacts with the VM 113 via the virtual assembler 112. The virtual assembler 112 is analogous to a conventional assembler or compiler in that it converts function calls written in a high-level programming language (termed Virtual Machine Control Language, or VCML) into instructions that the machine can understand and process. In this case, the instructions are in a format the virtual machine can process, termed Virtual Machine Language (VML).

The VS virtual machine (VM) 113 interacts with the platform drivers 114. The platform drivers 114 allow the virtual machine to interact with the operating system resident on the underlying host computer (platform). The platform drivers interact with one or more underlying hardware platform CPUs 116 via a platform assembler 115, which converts commands from virtual machine-level function calls to commands that the platform-specific operating system and hardware can understand and process.

The virtual operating system 103 has the ability to create multiple threads to perform tasks concurrently. When a new thread is created, a new virtual central processing unit (VCPU) is created along with the thread. Newly created VCPUs are not complete copies of the entire virtual machine. VCPUs contain only the components necessary for their respective processing tasks, such as the IU 201, PU 205, and NU 203. Certain components of the VM 113, such as the index memory 401, data memory 209, the configuration unit 202, and the network control unit 210 (comprising the backbone 'core' of a CPU), are not typically duplicated in threads. The resources and services provided by such components are shared among the other components of the virtual supercomputer.

A functional block diagram of the components and interconnections within the Virtual Machine 113 of FIG. 1, is shown in FIG. 2.

The IBR stack 202*a* is a set of Index Base Registers (IBR) (FIG. 5) that provides an indexed virtual addressing system for Node Index Memory (NIM) 401 index-word access. Each IBR (a register within the SCU 202) stores a relative base address that specifies a lower address boundary (Seg Addr) for a segment (SegNum) of the virtual supercomputer's NIM 401. In addition, the IBR specifies the type of architecture (shown in FIG. 4) that the segment comprises, and also a set of fields (DDN-I, DDN-D) that specify the configurations of the Index and Data words addressed by the given NLM segment. The content of each IBR is dynamically reconfigurable via execution of an SIBR instruction, as specified in the VML Instruction Set (Table 1).

The DDA Memory 202*b* is a table of Data-structure Definition Words (DDW)(FIG. 6), each identified by a unique integer Data Definition Number (DDN).

When a 'store data definition word' instruction is executed, if the DDN indicates that the DDW is new, the word is written into an available free memory location in the DDA 202*b*. If the DDN indicates the word is not new, the previous version of the DDW is overwritten with the new version. The address of the DDW to write into the table is located in the DDR 202*d*.

Figure 7:
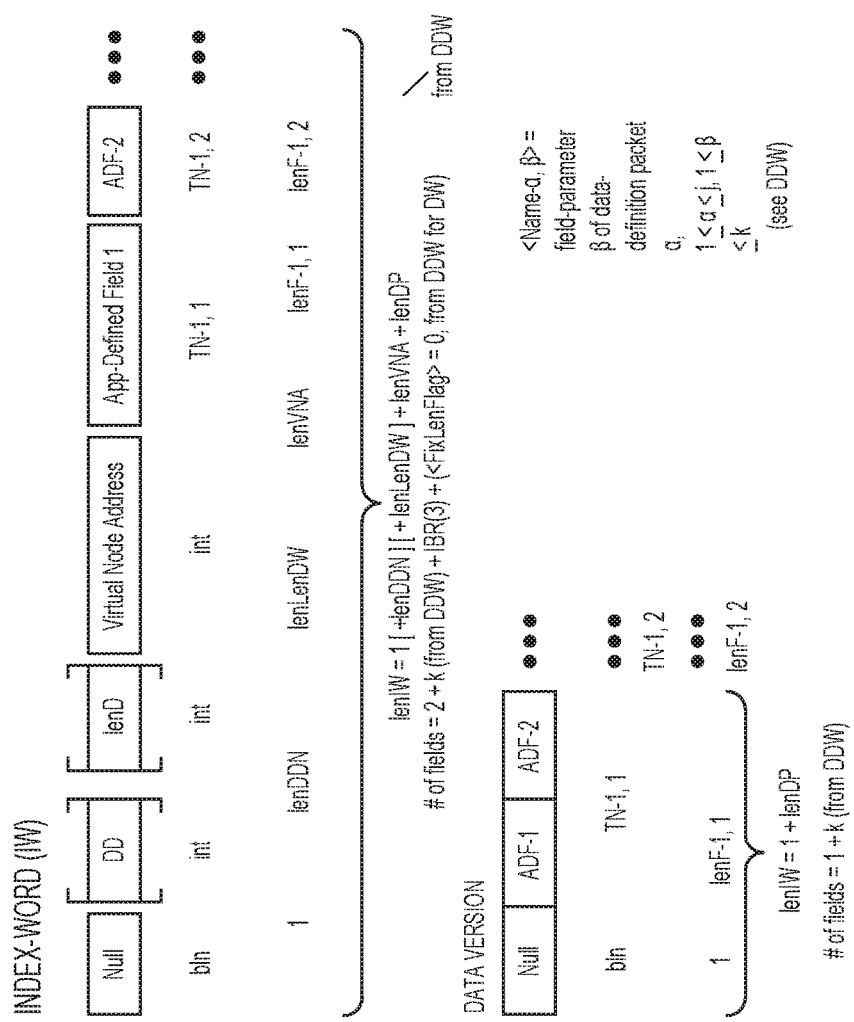
FIG. 7 is an illustration of an Index-Word (IW).

The Instantiation Unit (IU 201) creates the nodes and makes space for the nodes in the data representation. The IU 201 contains one node index word (IW) in the node index word register (IWR 201*a*). Each IW has the structure illustrated in FIG. 7.

The IW contains a null flag that is set when a delete instruction is executed for a specified node. The next field contains the DDN. Following the DDN is a field that specifies the length of the data word. Next is the Virtual Node Address (VNA) of the associated data word in Node Data Memory (NDM 209), followed finally by an application-defined field (ADF). The ADF can be used for special purposes defined by the specific application. The IW typically functions as the index (index version) for an associated data word (DW), but the IW can be used as an indexed data-word itself (data version), for optimal performance where the data structures are fixed-length and simple The node-counter (NC) register 204 is a virtual register containing a pointer to the next node. The NC 204 contains a node number that is a non-negative integer specifying the number of the node in the solution space currently being processed, and in the case of the first two types (303 and 304) of NIM architecture shown in FIG. 4, it also specifies the relative virtual address of the corresponding IW in the node index memory (NIM 401).

The Population Unit (PU 205) contains a node data word (DW) stored in a virtual register termed the node data-word register (DWR-P 205*a*). A DW may be fixed length or variable length. A fixed length flag indicates the type of a particular DW. The DW stored in the PU 205 is used when populating the solution space (Node Data Memory, NDM 209) with nodes. The PU 205 evaluates the data structure for a given node. The results of such evaluation are stored into a data word whose location in the NDM 209 is pointed to by the index word. Every data word has a unique relative address in the NDM 209 that is the VNA.

The navigation unit (NU 203), like the PU 205, contains a node data word (DW) stored in a virtual register labeled the node data word register (DWR-N 203*a*). This value is used when navigating through the solution space.

Figure 3:
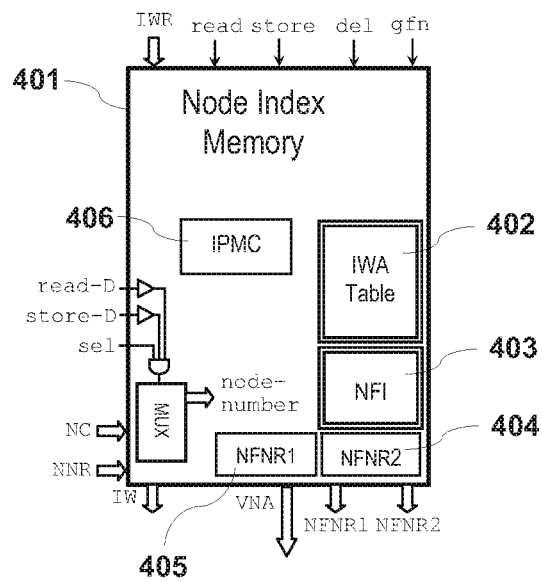
FIG. 3 is a diagram showing an enlarged view of the Node Index Memory unit.

The node index memory (NIM 401), as illustrated, by way of example, in FIG. 3, contains the Node Free Index (NFI 403) and the Next Free Node Registers (NFNR1 & 2 404 405). The NFI 403 stores the current intervals of free nodes in the node index space. The NFNRs 404 405 are loaded from the NFI 403, and store the beginning and the end of a particular range of free nodes. The primary use of the NFNRs 404 405 is during instantiation operations where unused node index words are overwritten. The NIM 401 also contains the Index Physical Memory Controller (IPMC 406), which maps the virtual index memory words to physical storage.

The arithmetic and logic unit (ALU 207) is a software implementation of some functions that are often implemented in hardware. It contains an adder/multiplier 250, a logic evaluator 255, an arithmetic register (AR 207*a*) stack, a lookup table index 207*b*, a function index 207*c*, and an ALU memory 207*d*. It allows as well for 'pass-though' of arithmetic operations to the underlying hardware CPU.

The data-memory physical memory controller (DPMC 208) operates between the NIM 401 and the NDM 209. The DPMC 208 controls the use of physical memory devices such as random access memory (RAM), disk drives, optical storage drives, and other physical memory devices which may be available to store data.

The network control unit (NCU 210) handles the low-level details of sending out data and processes to be processed (e.g., by networked machines 211). It in turn is controlled by a network manager. These two units handle the tasks of separating tasks to be run concurrently, load balancing, and other network and concurrency-related management tasks.

The CE 109 stores configuration parameters in the PCR 202*c*, and also creates and stores data definition words (DDW) via the DDR register 202*d* into the DDA 202*b*, according to the parameters specified by the domain application program 101.

The mapping of index words to physical memory is handled by the IM Physical Memory Controller (IPMC 406). The node number (NodeNum) is maintained internally by the VS Operating System (VS-OS 103) and does not have any necessary correspondence with node numbers as assigned by the Domain Application Program (DAP 101). The translation of domain application node-number to internal NodeNum values is handled by the VS-Application Programming Interface (VS-API 102).

The NodeNum values are assigned by the VS-OS 103. To enhance efficiency by eliminating the need for indexed addressing of Index Words, the node numbers may be assigned sequentially, as in architecture A 303 of FIG. 4, in which case, the node number corresponds to a direct relative offset address for the Index Word in NIM. The virtual address of each IW is thus obtained for architecture A 303 by the IPMC 406 via simple addition of the node number to the base address of the segment in NIM 401. Memory segments delineate portions of NIM 401 comprising one of the four types of index memory architecture (FIG. 4), and are defined by Index Base Registers (IBR 202*a*). The segment base addresses are contained in the IBR registers 202*a*, and assigned during initial configuration. For NIM architecture A 303, the configuration of each Index Word in a segment is stored in a corresponding Data Definition Word (DDW), pointed to by the DDN-I field in the IBR. In such case, the configuration of every index word is dynamically reconfigurable by reloading the DDW for a given segment.

Figure 4:
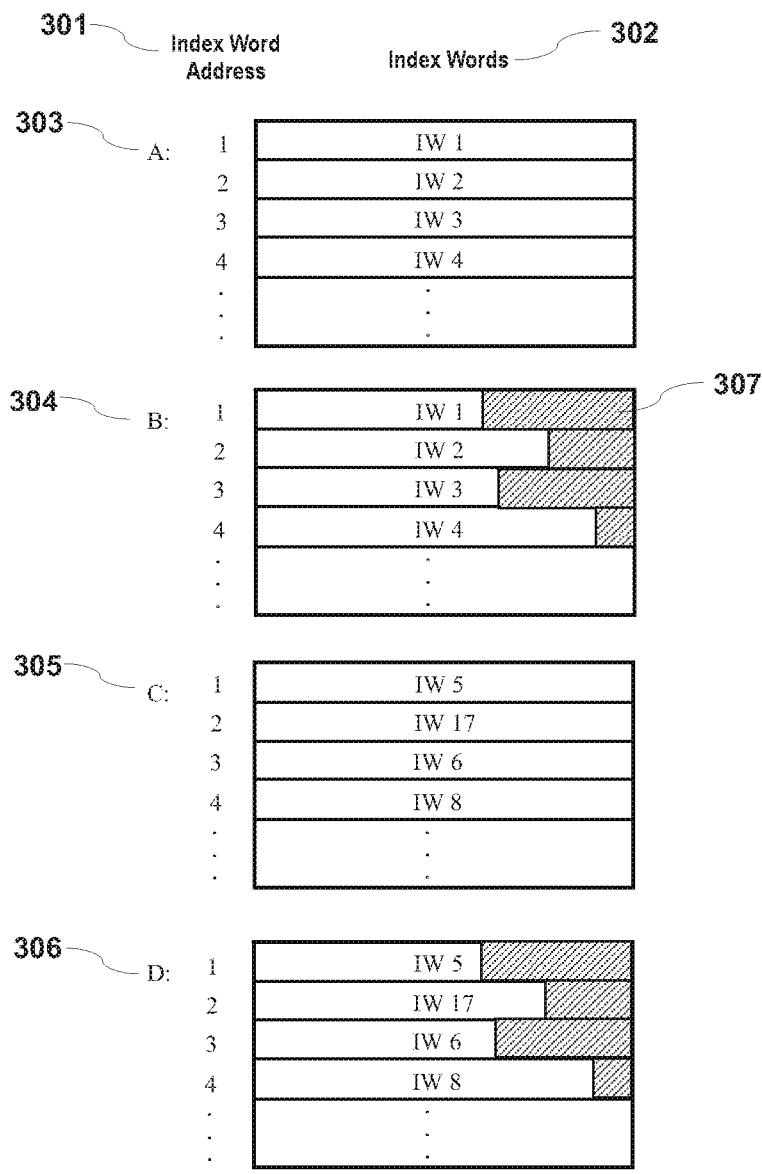
FIG. 4 is a diagram of the different Index Memory architectures implemented by embodiments of the present invention.

In FIG. 4 are shown the types of NIM 401 architectures that are supported by an embodiment of the present invention. In architecture A 303 (sequential IW addressing, homogenous NIM segments), each virtual memory segment of the NIM 401 is composed of index words 302 configured identically, and the address of each word 301 is given by the sequential node number (NodeNum) that corresponds to an offset from the segment base address, which is stored in the Index Base Registers 202*a*. The IW address (IWA) is thus obtained by the IPMC 406 via:

$$IWA \leftarrow NodeNum*LenIW,$$

where LenIW is the length of the IW, and is obtained from the LenDP field of the Data Definition Word (DDW) pointed to by the DDN-I field of the IBR.

In Architecture B 304 (sequential node-number addressing, heterogeneous IW), index words 302 can each be of different configuration within the segment. The sequential addressing has the advantage of not requiring an Index Word Address Table (IWAT) 402. The varying IW configurations allow for less reshuffling of Node Index Memory 401 as nodes are created, but has the disadvantage of unused space 307 between physical index words. This is overcome by obtaining the LenIW field for every IW (in contrast to Architecture A, which only requires retrieving the LenIW field once for each segment), which offsets some of the efficiency of sequential addressing but reduces the need for garbage collection. The IWA is thus obtained by the IPMC 406 via:

$$IWA \leftarrow NodeNum*LenIW,$$

where $LenIW \leftarrow DDW(IW)$.

In Architecture C 305 (non-sequential IW addressing, homogeneous IW configuration), index words 302 are not sequential, and thus requires an Index Word Address Table (IWAT 402), which is a table stored in the NIM 401 that specifies the IW address for each Node Number. Although the addressing is random-access, the index words in each segment are still identically configured, and thus this scheme has no unused inter-word space. The IWA is thus obtained by the IPMC 406 via:

$$IWA \leftarrow IWAT(NodeNum)$$

Architecture D 306 (non-sequential IW addressing, heterogeneous IW) is a fully random-access architecture, whereby index-words 302 are not sequential, nor are they identically configured. This enables dynamic changes in memory architecture to fully exploit changes in domain problem data or architecture requirements. The tradeoff is that it requires both an IWAT 402 and background garbage-collection to minimize unused NIM 401 space. The IWA is obtained via $$IWA \leftarrow IWAT(DDW).$$

In addition to the IWAT 402, the VM 113 architecture includes the following:
1. The Index-Segment Base-Address Registers (IBR 202*a*) include a Segment Number (SegNum) field, Segment Address (SegAddr) field, which specifies the relative physical address of that segment number, and a Type field that specifies which of the four architectures applies to that segment. The contents of these fields are dynamically reconfigurable.
2. A CRE (create node) VM 113 instruction includes an integer operand field, [opnd.I 3], which specifies the segment number (SegNum) to which the node is to be assigned, as shown in the CRE instruction within Table 1 (the VML Instruction Set).

| CRE | create node (store IW) | [opnd.I2] [opnd.I3] | Boolean Integer |

TABLE 1

Virtual Machine Language (VML) Instruction Set

| VM Unit | Mnemonic | Operation | Operands | Opnd Type | Description |
|---|---|---|---|---|---|
| NC | SET | set NC | opnd.NC1 | integer | Set NC to <opnd.NC1>. |
|  | INC | increment NC | [opnd.NC2] | integer | Increment NC by one or <opnd.NC2>. |
|  | DEC | decrement NC | [opnd.NC2] | integer | Decrement NC by one or <opnd.NC2>. |
| SCU | LPCR | load PCR | opnd. CU1 (n) | integer-array | Set each field in the PCR to its corresponding element in the integer-array <opnd.CU1>. The dimension n of CU1 is the number of fields in the PCR, givers by <opnd.CU1 (0) >→ PCR(0) = NumPCRflds. |
|  | LMA | load (set) IM & DM allocation registers | opnd.CU2 (2) | integer-array | Set the IMA register to the amount of memory, in megabytes, to be allocated to index-memory, as given by <opnd.CU2 (0) >, and set the DMA register to the amount of memory allocation for data-memory, as given by <opnd.CU2 (1) >. |

TABLE 1-continued

Virtual Machine Language (VML) Instruction Set

| VM Unit | Mnemonic | Operation | Operands | Opnd Type | Description |
|---|---|---|---|---|---|
| | LDDR | load DDR | opnd.CU3 (n) | variant-array | Set each field in the DDR to its corresponding element in the variant-array <opnd.CU3>. The dimension n of CU3 is available from the configuration details of the data definition. If n = 1 (one element), then the single operand field is loaded into DDR(0) to specify the DDN for a subsequent read (GDDW) instruction. |
| | SDDW | store DDA word | [opnd.CU4] | bolean | Store (write to) each field in the DDA memory- word pointed to by DDN = DDR(0) with its corresponding field value in the DDR. If the DDN is new (not found in the DDA), then increment DDCR. If <opnd.CU4> = True, then the instruction becomes a delete, and the DDN of the corresponding DDA word is set to zero (which flags the word as null), and the DDCR is then decremented. |
| | GDDW | get (read) DDA word | — | — | Set each field in the DDR to the corresponding field in the DDA word pointed to by DDN = DDR(0), |
| | CDDA | clear DDA | — | — | Set the DDN field of all DDA words (count given by DDCR) to zero. Set DDCR to zero. This happens by default at 'power-up' (initialization). |
| | SFT | store Field Type word | opnd.CU5 (2) | variant-array | Load the FTR from <opnd.CU5>, then execute a store into FTT word pointed to by FTR(0) = CU5(0) = TypeNum. If <opnd.CU5> is a single element, then only FTR(0) is loaded, and no store is executed, in preparation for a subsequent read (GFT) instruction. |
| | GFT | get (read) FT word | — | — | Load the FTR from the FTT word pointed to by FTR(0) = TypeNum. |
| | SIBR | set an IB Register | opnd.CU6 opnd.CU7 (5) | integer variant-array | Set all fields of IBR(i), where i = <opnd.CU6>, to <opnd.CU7>. |
| IU | RIW | read IW | — | — | Set IWR to IW(NC). This allows the reading of IW contents, primarily as a precursor to navigating, populating or re-instantiating a node. |
| | LIWR | load IWR | opnd.I1 (n) | variant-array | If the VM is operating in 'compact mode', then the single (n = 1) operand bit-string is loaded into the IWR (Index Word portion). Otherwise, the fields of the IWR, as defined (prior) by the configuration of the DDW pointed to by the DDN-I field of the relevant IBR (based upon NC), are loaded from the corresponding operand-array elements. The length of the IWR, and the number of fields (the dimension n of the |

TABLE 1-continued

Virtual Machine Language (VML) Instruction Set

| VM Unit | Mnemonic | Operation | Operands | Opnd Type | Description |
|---|---|---|---|---|---|
| | | | | | operand array), are calculated prior to this instruction, from details contained in the associated DDW. This instruction is typically a precursor to executing a CRE instruction. |
| | CRE | create node (store IW) | [opnd.I2] [opnd.I3] | boolean | If <opnd.I2> = True, then create (instantiate) a node at node-number = NNR, else create node at node-number = NC (default). To create a node, the contents of the IWR (except the Null Flag), are stored as an IW in Index Memory at a relative address computed by the NIM memory controller according to the type of NIM architecture, which is derived from which segment the node is to be assigned as specified by <opnd.I3>. In 'compact mode', the storing of the IWR is a simple binary transfer. Otherwise, the fields of the IWR are stored into corresponding IW-array elements. The NC is then incremented (to optimize serial instantiation). If the node had been null, then clear the Null Flag of the IW, update the NFI, and increment NNR. Note that if the IW is a data version, then the ADFs may be null, to be filled later via a PDW instruction. |
| | DEL | delete node | — | — | Delete node (set Null Flag) in IW at node-number = NC. Also, if node had not been null, then update NFI, and decrement NNR. |
| | GFNR | get free node range | — | — | Sets NFNR1 & NFNR2 to the boundaries of the next-free-node-range, where NFNR1 ≥ NC. (The internal IM controller scans the NFI, and finds the first null node or node-range ≥ NC. This instruction is therefore slower, as it executes an embedded microcode procedure.) |
| PU | LDWR | load DWR | opnd.P1 (n) | variant-array | If the VM is operating in 'compact mode', then the single (n = 1) operand bit-string is loaded into DWR-P. Otherwise, the fields of DWR-P, as defined (prior) by the configuration of the DDW pointed to by either the DDN-D field of the relevant IBR (based upon NC), or by the DDN of the associated IW, are loaded from the corresponding operand-array elements. The length of the DWR, and the number of fields (the dimension n of the operand array), are calculated prior to this instruction, from details contained in the associated DDW. |

TABLE 1-continued

Virtual Machine Language (VML) Instruction Set

| VM Unit | Mnemonic | Operation | Operands | Opnd Type | Description |
|---|---|---|---|---|---|
| | PDW | populate (store) DW | [opnd.P2] [opnd.P3] | boolean boolean | If <opnd.P2> = True, the IW is a data-version and the contents of DWR-P are stored into the data portion of the IW located at address = NC. Otherwise (index version), store the contents of DWR-P into the DW located at if <opnd.P3> = False (pre-ecution address retrieval), then VNA ← IWR(VNA); else (execution-time address retrieval), VNA ← IW(NC). Note that if the length of the DW has changed, then a new VNA must be obtained by the DM internal controller (in conjunction with the PMC), which then automatically rewrites the new VNA into the corresponding field of both the IW, and the IWR In 'compact mode' the store operation is a simple binary transfer. Otherwise, the fields of the DWR are stored into corresponding DW (or IW) array elements. The NC is then incremented (to optimize serial population). |
| NU | GDW | get (read) DW | [opnd.N1] | bolean | Load DWR-N with the contents of the DW at the VNA selected by <opnd.N1>, same action as for <opnd.P3>. GDW is the basic navigation operation. |

It will be appreciated that the embodiments described above and illustrated in the drawings represent only a few of the many ways of implementing embodiments for dynamic memory management for a virtual supercomputer.

The topology or environment of the present invention embodiments may include any number of computer or other processing systems and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any type of computer or processing system (e.g., mainframe, server, PC, desktop, laptop, mobile device, etc.), and may include any commercially available operating system and any commercially available or custom software. These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flow charts and/or diagrams illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among computer systems, and/or any other intermediary processing devices. The software and/or algorithms described above and illustrated in the drawings may be modified in any manner that accomplishes the functions described herein. In addition, the functions in the drawings or description may be performed in any order that accomplishes a desired operation.

The software of the present invention embodiments may be available on a recordable or computer usable medium (e.g., magnetic or optical mediums, magneto-optic mediums, CD-ROM, DVD, memory devices, etc.) for use on stand-alone systems or systems connected by a network or other communications medium.

The present invention embodiments may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store any desired information. The database system may be included within or coupled to the computer systems. The database systems and/or storage structures may be remote from or local to the computer or other processing systems, and may store any desired data.

The present invention embodiments may employ any number of any type of user or application interface (e.g., Graphical User Interface (GUI), command-line, prompt, API, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). Interface screens may include any suitable actuators (e.g., links, tabs, etc.) to navigate between the screens in any fashion.

What is claimed is:

1. A system to manage memory comprising: a computer system, including at least one processor and an operating system to control operation of said computer system, to dynamically configure and emulate a hardware architecture of a processing system that processes one or more nodes to determine a solution for a problem, wherein at least one of said nodes includes data for said problem and said computer system further includes:
   a virtual machine unit to emulate said hardware architecture and manage said nodes within a solution space, wherein said hardware architecture is designed to process said nodes;
   a virtual operating system to configure said virtual machine unit and to control operation of said virtual machine unit to emulate said hardware architecture based on parameters, wherein said virtual machine unit includes:
      a plurality of node modules to manage the one or more nodes;
      a node index memory including a plurality of memory segments storing one or more index words each indicating a configuration for an associated node; and
      an index memory module to dynamically reconfigure an architecture of the node index memory, wherein each memory segment of the node index memory implements a dynamically specifiable memory architecture and at least two different memory segments enable different memory architectures, wherein the memory architectures include an architecture storing index words of variable length in a non-sequential order of node identifiers within a segment, and wherein the node index memory includes a structure including a node identifier and an address of a corresponding index word in a segment for accessing the index words stored in the non-sequential order of node identifiers.

2. The system of claim 1, wherein the emulated hardware architecture includes an instruction set, and operates on the at least one processor.

3. The system of claim 1, wherein the emulated processing system includes a distributed network of processing elements each employing the emulated hardware architecture.

4. The system of claim 1, wherein at least one node is associated with an index word and a data word.

5. The system of claim 1, wherein each node represents one or more data structures selected from a group of: numeric tags, character tags, Boolean flags, numeric values, character values, object IDs, database-record IDs, simple arrays, variable-density multidimensional arrays, symbolic functions, mathematical functions, connection pointers to other nodes, function pointers, lookup-table list pointers, linked-lists, and pointers to other solution spaces or data representations.

6. The system of claim 1, wherein the one or more nodes include a plurality of nodes that are interconnected in one or more topologies selected from a group of: independent point-clouds, ordered sets of points, acyclic graphs, cyclic graphs, balanced trees, recombining graphs, meshes, lattices, and combinations thereof.

7. The system of claim 1, wherein the virtual machine unit includes:
   a first virtual unit to configure nodes and the emulated hardware architecture, including register structures, node data structures, arithmetic modes, and memory schemes;
   a second virtual unit to create nodes, compute results for nodes, navigate nodes, and alter nodes and interconnections;
   a third virtual unit to provide function evaluation and fixed-point integer arithmetic with application-selectable precision; and
   a fourth virtual unit to manage distribution of data and processes and dynamically reconfigure an architecture of the node index memory.

8. A method for managing memory comprising:
   dynamically configuring and emulating, via a computer system including at least one processor and an operating system to control operation of said computer system, a hardware architecture of a processing system that processes one or more nodes to determine a solution for a problem, wherein at least one of said nodes includes data for said problem;
   configuring and controlling emulation of said hardware architecture based on parameters, wherein said configuring and controlling further includes:
      managing the one or more nodes; and
      dynamically reconfiguring an architecture of a node index memory including a plurality of memory segments storing one or more index words each indicating a configuration for an associated node, wherein each memory segment of the node index memory implements a dynamically specifiable memory architecture and at least two different memory segments enable different memory architectures, wherein the memory architectures include an architecture storing index words of variable length in a non-sequential order of node identifiers within a segment, and wherein the node index memory includes a structure including a node identifier and an address of a corresponding index word in a segment for accessing the index words stored in the non-sequential order of node identifiers.

9. The method of claim 8, wherein the emulated hardware architecture includes an instruction set, and operates on the at least one processor.

10. The method of claim 8, wherein the emulated processing system includes a distributed network of processing elements each employing the emulated hardware architecture.

11. The method of claim 8, wherein at least one node is associated with an index word and a data word.

12. The method of claim 8, wherein each node represents one or more data structures selected from a group of: numeric tags, character tags, Boolean flags, numeric values, character values, object IDs, database-record IDs, simple arrays, variable-density multidimensional arrays, symbolic functions, mathematical functions, connection pointers to other nodes, function pointers, lookup-table list pointers, linked-lists, and pointers to other solution spaces or data representations.

13. The method of claim 8, wherein the one or more nodes include a plurality of nodes that are interconnected in one or more topologies selected from a group of: independent point-clouds, ordered sets of points, acyclic graphs, cyclic graphs, balanced trees, recombining graphs, meshes, lattices, and combinations thereof.

14. The method of claim 8, wherein the configuring and controlling further includes:
 configuring nodes and the emulated hardware architecture, including register structures, node data structures, arithmetic modes, and memory schemes;
 creating nodes, computing results for nodes, navigating nodes, and altering nodes and interconnections;
 providing function evaluation and fixed-point integer arithmetic with application-selectable precision; and
 managing distribution of data and processes and dynamically reconfiguring an architecture of the node index memory.

* * * * *